United States Patent
Yudis et al.

(10) Patent No.: US 6,997,420 B2
(45) Date of Patent: Feb. 14, 2006

(54) PNEUMATIC LOCKOUT DEVICE

(75) Inventors: Donald W. Yudis, Cumming, GA (US); Michael Scott Adams, Cumming, GA (US)

(73) Assignee: Panduit Corp., Tinley Park, IL (US)

( * ) Notice: Subject to any disclaimer, the term of this patent is extended or adjusted under 35 U.S.C. 154(b) by 222 days.

(21) Appl. No.: 10/654,341

(22) Filed: Sep. 3, 2003

(65) Prior Publication Data

US 2005/0045776 A1 Mar. 3, 2005

(51) Int. Cl.
*E05B 73/00* (2006.01)
*F16L 35/00* (2006.01)
*A47G 29/00* (2006.01)

(52) U.S. Cl. .................. 248/89; 285/80; 285/124.4; 70/14

(58) Field of Classification Search ............ 248/89, 248/551, 552, 222.52, 225.11; 137/377; 285/80, 285/81, 91, 315, 316, 124.4; 70/14–19; D8/333
See application file for complete search history.

(56) References Cited

U.S. PATENT DOCUMENTS

| | | | |
|---|---|---|---|
| 725,290 A | | 4/1903 | Speer |
| 932,437 A | | 8/1909 | Brady |
| 1,495,630 A | | 5/1924 | Bees |
| 2,824,651 A | * | 2/1958 | Davis ........................... 211/69 |
| 3,116,730 A | * | 1/1964 | Tingley ...................... 124/24.1 |
| 3,472,389 A | * | 10/1969 | Lowe .......................... 211/70 |
| 3,662,320 A | | 5/1972 | Marx |
| 4,382,619 A | * | 5/1983 | Grisebach ................. 285/124.4 |
| 4,544,185 A | * | 10/1985 | Weirich et al. .......... 285/124.4 |
| 4,638,469 A | * | 1/1987 | Bryant et al. ................ 367/154 |
| 5,003,797 A | | 4/1991 | Wirth et al. |
| 5,066,049 A | * | 11/1991 | Staples ........................ 285/80 |
| 5,073,122 A | | 12/1991 | Burke |
| 5,092,359 A | | 3/1992 | Wirth et al. |
| 5,182,928 A | | 2/1993 | O'Fearna |
| 5,207,590 A | | 5/1993 | Benda |
| 5,244,008 A | | 9/1993 | Bauer |
| 5,273,445 A | | 12/1993 | Ehrenfels et al. |
| 5,310,969 A | | 5/1994 | Turek et al. |
| 5,316,347 A | * | 5/1994 | Arosio ....................... 248/682 |
| 5,326,068 A | * | 7/1994 | Spears ....................... 248/682 |
| 5,415,017 A | | 5/1995 | Benda et al. |
| 5,462,316 A | * | 10/1995 | Street et al. .................. 285/81 |
| 5,500,495 A | | 3/1996 | Benda et al. |
| 5,543,593 A | | 8/1996 | Turek |
| 5,577,599 A | | 11/1996 | Turek et al. |
| 5,638,857 A | | 6/1997 | Alcumbrack |
| 5,690,088 A | * | 11/1997 | Ruble ........................ 124/25.7 |
| 5,823,020 A | | 10/1998 | Benda |
| 5,823,023 A | | 10/1998 | Benda |
| 5,868,242 A | | 2/1999 | Hall et al. |
| 5,881,582 A | | 3/1999 | Monaco |
| D415,949 S | * | 11/1999 | Reed .......................... D8/333 |
| 6,469,264 B1 | | 10/2002 | Benda |
| 6,626,465 B1 | * | 9/2003 | Lacroix et al. ............... 285/80 |

FOREIGN PATENT DOCUMENTS

| | | | |
|---|---|---|---|
| DE | 3313032 A1 | * | 10/1984 |
| EP | 0 578 770 B1 | | 5/1996 |
| WO | WO 02/077901 A2 | | 10/2002 |

OTHER PUBLICATIONS

Seton website, Shock–Stop Hasps, Aug. 20, 2003, 1 page.
Brady Worldwide, Inc. website, Pneumatic Quick–Disconnect Lockout, Aug. 26, 2003, 1 page.
Prinzing Enterprises, Inc. website, Pneumatic Plug Lockout, Aug. 27, 2003, 3 pages.

\* cited by examiner

*Primary Examiner*—Anita M. King
(74) *Attorney, Agent, or Firm*—Robert A. McCann; Christopher S. Clancy (57) ABSTRACT

A pneumatic lockout device is disclosed. The device includes a first disc having a first slot and a first tab, and a second disc having a second slot and a second tab. The first disc is secured to the second disc. The device further includes a pneumatic fitting having a fitting groove positionable within the first slot and the second slot. The pneumatic lockout device is movable from an unlocked position to a locked position, while the fitting groove is positioned within the first slot and the second slot.

11 Claims, 7 Drawing Sheets

PNEUMATIC LOCKOUT DEVICE

BACKGROUND OF THE INVENTION

The present invention is directed to a pneumatic lockout device and, more particularly, to a pneumatic lockout device having the ability to lockout a large range of male pneumatic fittings.

Pneumatic lockout devices intended to block a male pneumatic fitting from engaging a female pneumatic fitting are known in the lockout industry. One such device is Prinzing Enterprises, Inc.'s pneumatic plug lockout, identified as part number PLO27E. This box-style lockout includes two box halves connected by a hinge, with a variety of circular openings between the halves to allow the device to be closed on the locking groove of a male pneumatic fitting. The two halves can then be locked together to prevent opening the device to remove the fitting secured therein. However, this lockout device is relatively large and difficult to use in tight spaces. Moreover, this lockout device can be removed with moderate force with the padlock still in place.

Another lockout device is disclosed in U.S. Pat. No. 5,638,857, owned by Brady Worldwide, Inc. The air lockout device is applied to a male fitting, isolating equipment from all compressed air sources. The center of the device allows for permanent storage on an air hose and a loop on the side can be used to hang the hose and lockout device. A padlock with ¼ or 9/32 inch shackle diameter is required. The padlock must be fully removed to remove the lockout device from the fitting. However, this device is specific to one size fitting. Although Brady Worldwide also offers a Y-shaped variation of this air lockout device that offers three hole sizes to fit three different fittings, this Y-shaped lockout device still only accommodates three different size fittings. Moreover, if an incorrect lock size is used, the padlock shank may fail to engage the fitting properly and the lockout device could be removed from the fitting without first removing the padlock.

Yet another lockout device is the SHOCK-STOP® electrical lockout device offered by Brady Worldwide. This lockout device consists of two octagonal-shaped plates secured to each other, with each plate having a receiving member for securing a fitting therein. However, this lockout device is specific to one size fitting, and cannot lockout pneumatic fittings.

SUMMARY OF THE INVENTION

It would be desirable to provide a pneumatic lockout device having the ability to lockout a large range of male pneumatic fittings.

It would also be desirable to provide a pneumatic lockout device having the ability to be utilized in tight spaces.

It would further be desirable to provide a pneumatic lockout device having a compact, tamper-resistant design.

A pneumatic lockout device is disclosed. The device includes a first disc having a first slot and a first tab, and a second disc having a second slot and a second tab. The first disc is secured to the second disc. The device further includes a pneumatic fitting having a fitting groove positionable within the first slot and the second slot. The pneumatic lockout device is movable from an unlocked position to a locked position, while the fitting groove is positioned within the first slot and the second slot.

Preferably, the first disc has five L-shaped slots, each slot accommodating at least one different size pneumatic fitting. Similarly, the second disc has five U-shaped slots, each slot accommodating at least one different size pneumatic fitting. In the unlocked position, the U-shaped and L-shaped slots are aligned.

Preferably, the first disc has two tabs and the second disc has two tabs.

Preferably, the first disc is fastened to the second disc by a rivet, and the first disc and the second disc can fully rotate about the rivet. In the locked position, the first disc and the second disc have been rotated to capture the pneumatic fitting.

Preferably, the first disc has a first lock aperture and a first female fitting standoff. Likewise, the second disc has a second lock aperture and a second female fitting standoff. In the locked position, the lock apertures are aligned to accept a locking device therethrough. Moreover, in the locked position, the female fitting standoffs are aligned.

DETAILED DESCRIPTION OF PREFERRED EMBODIMENTS

The illustrated embodiments of the invention are directed to a pneumatic lockout device having the ability to lockout a large range of male pneumatic fittings. The pneumatic lockout device has a compact design that allows it to be utilized in tight spaces.

Figure 1:
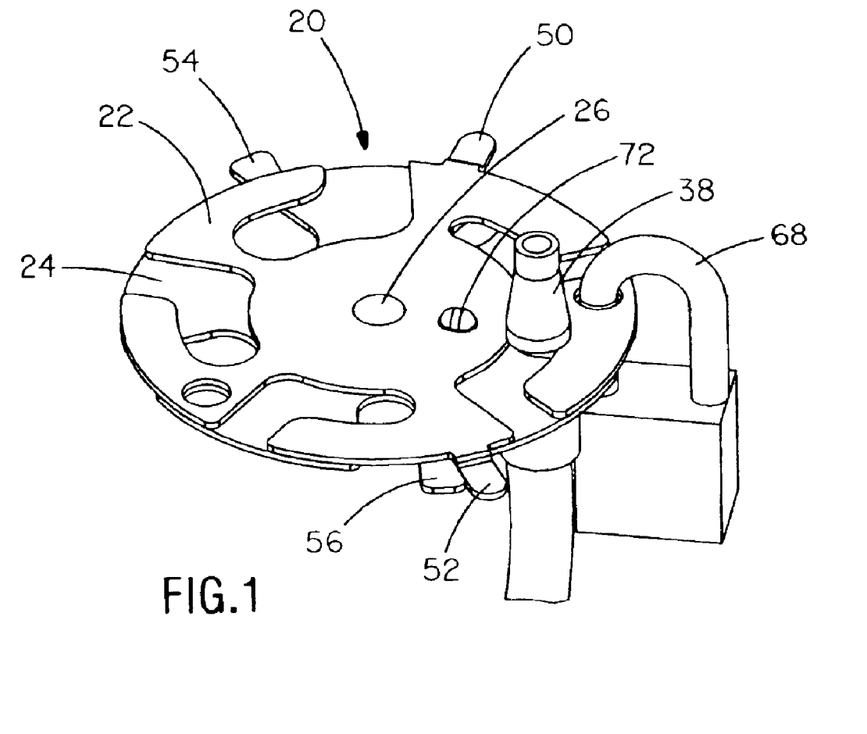
FIG. 1 is a top perspective view of a pneumatic lockout device according to the present invention.
Figure 2:
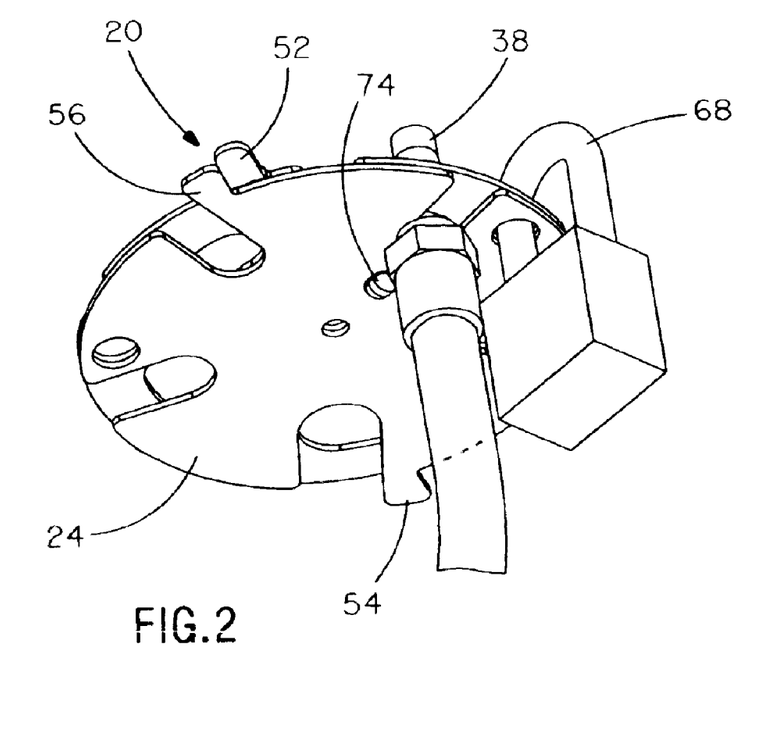
FIG. 2 is a bottom perspective view of the pneumatic lockout device of FIG. 1.

FIGS. 1 and 2 show a pneumatic lockout device 20 in the fully locked position. The device 20 comprises first disc 22 and second disc 24 fastened together through their centers by rivet 26, and first disc 22 and second disc 24 are free to rotate about rivet 26. When fastened together, first disc 22 and second disc 24 have a combined thickness such that the discs can engage the fitting groove of most standard pneumatic fittings. Although first disc 22 and second disc 24 are shown secured together by rivet 26, it is likewise contemplated that first disc 22 and second disc 24 may be secured together by any known fastening means. Preferably, first disc 22 and second disc 24 are metal or plastic. However, it is likewise contemplated that first disc 22 and second disc 24 may be made of other various materials.

Figure 4:
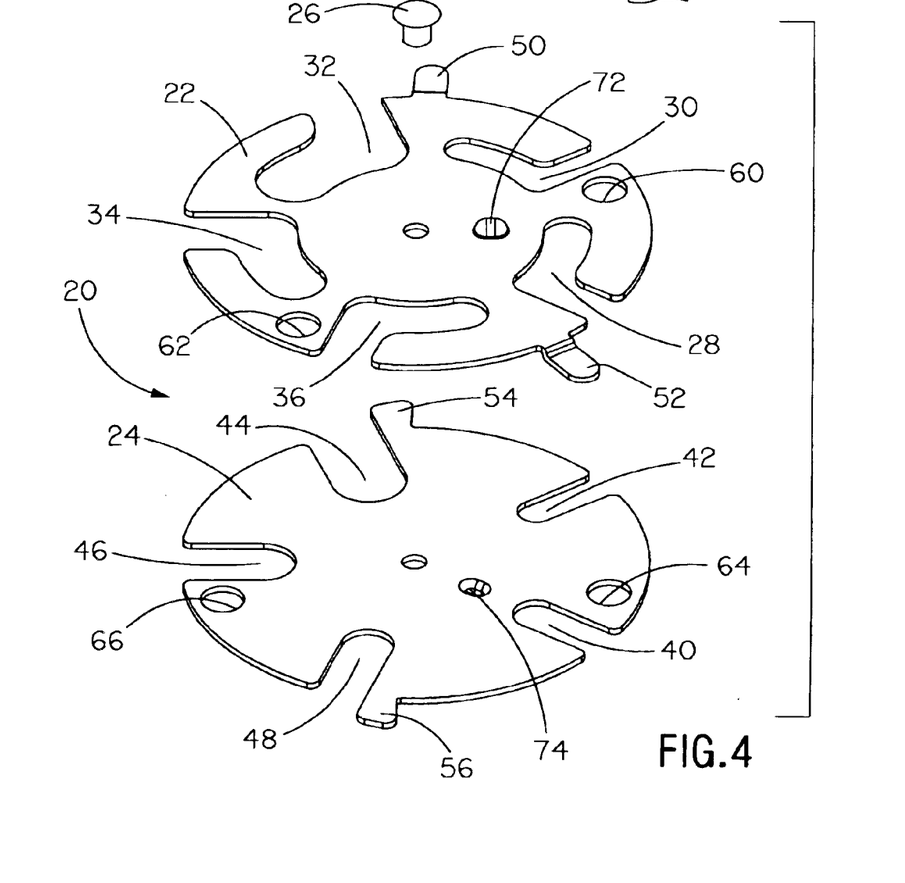
FIG. 4 is an exploded view of the two discs utilized in the pneumatic lockout device of FIG. 1.

As best seen in FIG. 4, first disc 22 has five slots 28, 30, 32, 34, 36 corresponding to different sizes of mate pneumatic fittings, such as pneumatic fitting 38, and each slot accommodates one or more different sizes of male pneumatic fittings. Preferably, as shown in FIG. 4, slots 28, 30, 32, 34, 36 are L-shaped. However, it is likewise contemplated that the slots may be other shapes and sizes. Second disc 24 also has five slots 40, 42, 44, 46, 48 corresponding to different sizes of male pneumatic fittings, and each slot accommodates one or more different sizes of male pneumatic fittings. Preferably, as shown in FIG. 4, slots 40, 42, 44, 46, 48 are U-shaped. However, it is likewise contemplated that the slots may be various shapes or sizes. In total, device 20 can be utilized with ten or more different sizes of male pneumatic fittings.

Figure 3:
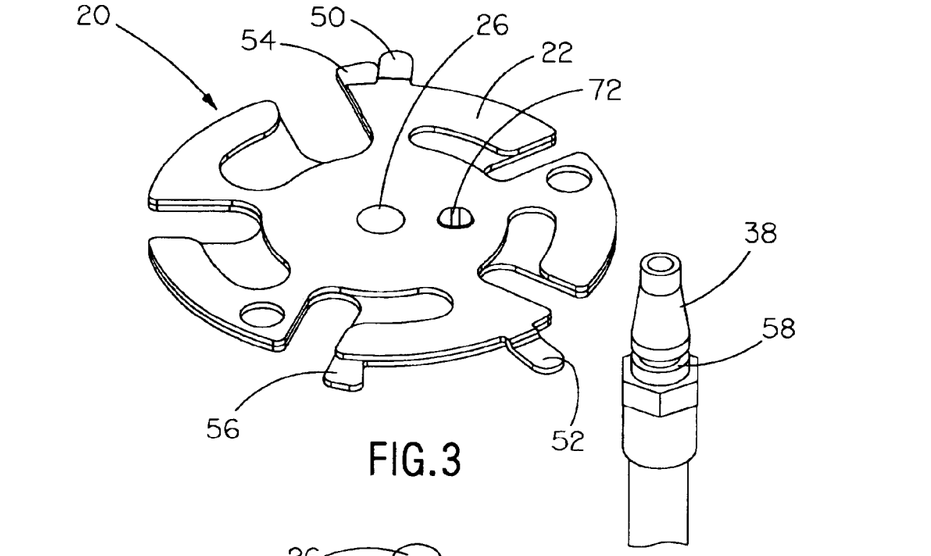
FIG. 3 is a top perspective view of the pneumatic lockout device of FIG. 1, prior to insertion of a male pneumatic fitting.
Figure 5:
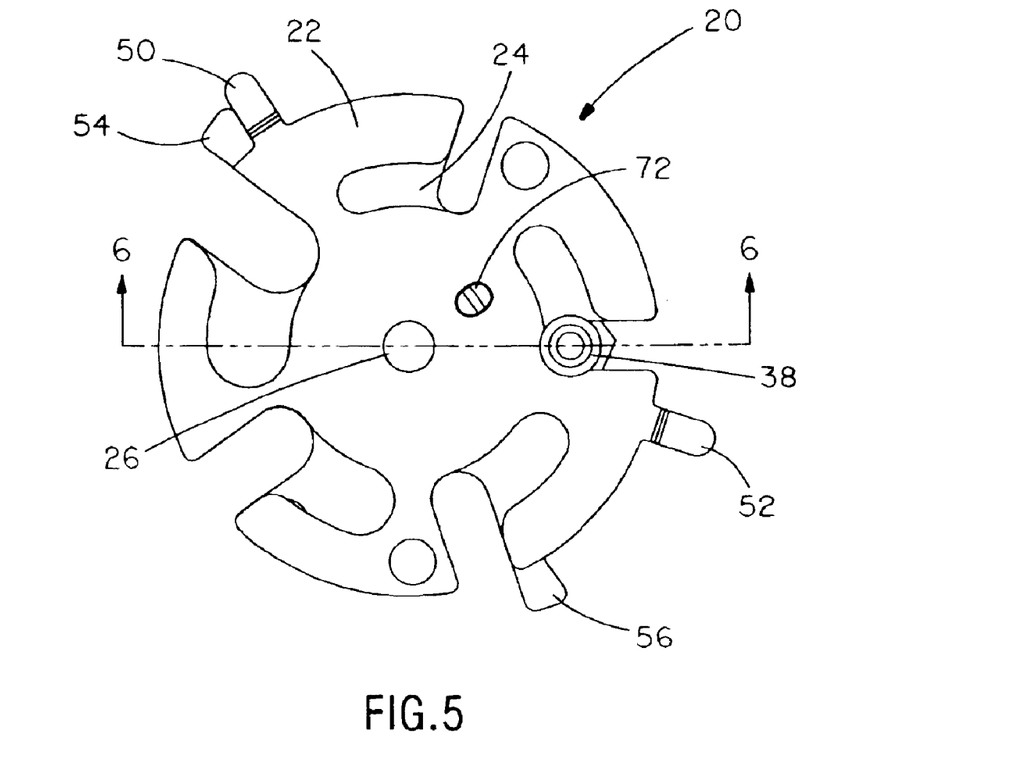
FIG. 5 is a top view of the pneumatic lockout device of FIG. 3, after insertion of the male pneumatic fitting.
Figure 7:
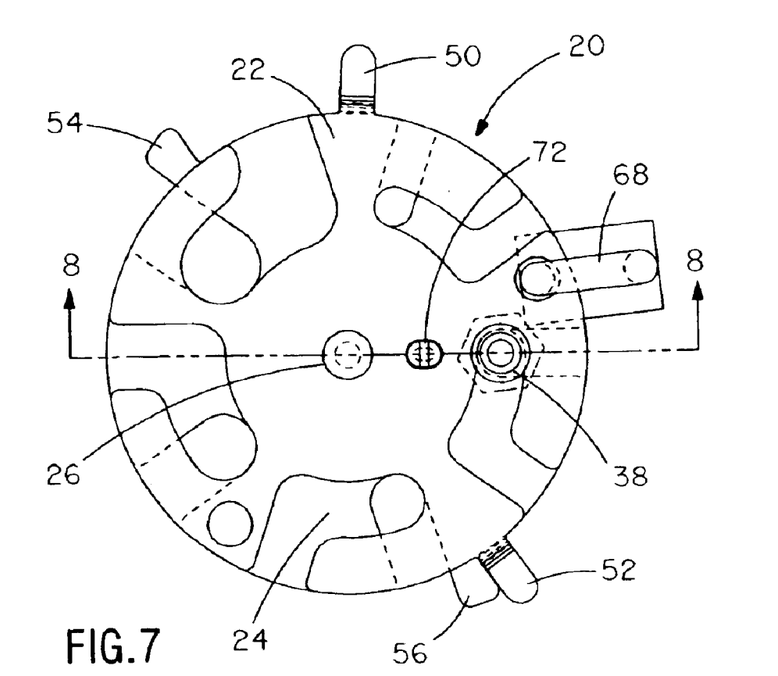
FIG. 7 is a top view of the pneumatic lockout device of FIG. 1.

As shown in FIGS. 4 and 5, first disc 22 has two tabs 50, 52, and second disc 24 has two tabs 54, 56. The tabs prevent 360° rotation of first disc 22 and second disc 24, and provide a positive stop when first disc 22 and second disc 24 reach the fully unlocked (see FIG. 5) and fully locked (see FIG. 7) positions. As shown in FIG. 5 in the unlocked position, L-shaped slots 28, 30, 32, 34, 36 align with U-shaped slots 40, 42, 44, 46, 48, respectively, thus allowing a fitting groove 58 of pneumatic fitting 38 to be positioned therein. A TWIST-LOCK® style pneumatic fitting design is shown in FIG. 3. However, it is likewise contemplated that any of the following standard pneumatic fitting designs may be utilized: 10 Series, HF Series, DM Series, 20 Series, 30 Series, E-z-mate Series, 50 Series, 70 Series, RF Series, or CJ Series.

As best seen in FIG. 4, first disc 22 has lock apertures 60, 62, and second disc 24 has lock apertures 64, 66. The lock apertures may be positioned at any location on first disc 22 and second disc 24. Unlike the Brady Worldwide air lockout device which requires a ¼ or 9/32 inch shackle diameter, the lock apertures of the present invention accommodate ¼, 9/32 or 5/16 inch shackle diameters. Although first disc 22 and second disc 24 are shown having two lock apertures, it is likewise contemplated that each disc may have any number of lock apertures.

After pneumatic fitting is 38 positioned within L-shaped slot 28 and U-shaped slot 40, as shown in FIG. 5, first disc 22 is rotated to capture pneumatic fitting 38, and lock apertures 60, 64 align to accept a locking device, such as padlock 68. First disc 22 and second disc 24 cannot rotate once padlock 68 is installed in lock apertures 60, 64. Another padlock may be inserted through lock apertures 62, 66 to further secure device 20.

Figure 6:
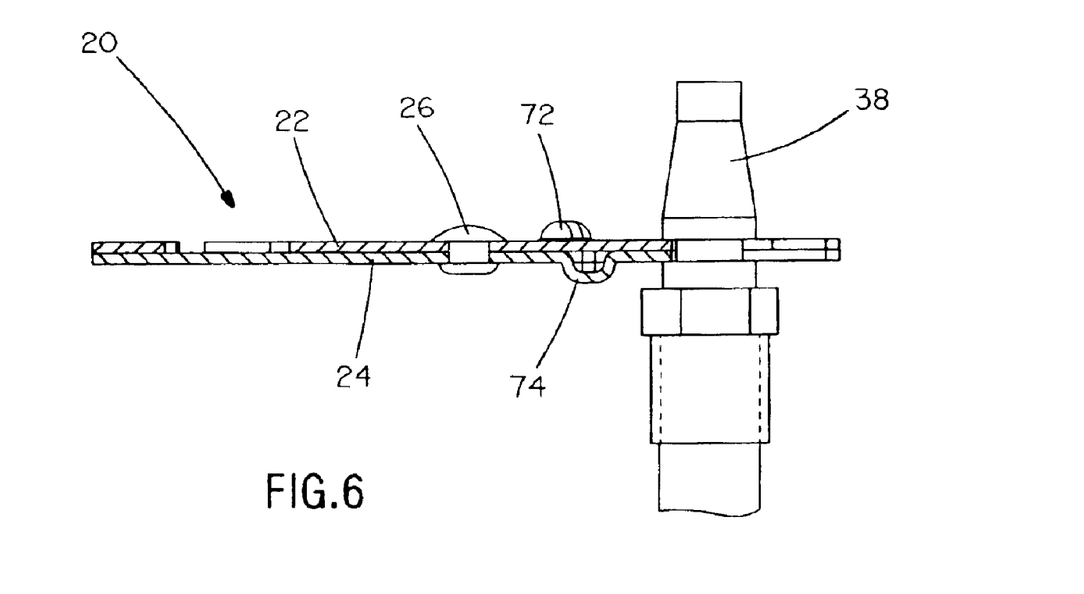
FIG. 6 is a cross-sectional view taken along lines 6—6 of FIG. 5.
Figure 8:
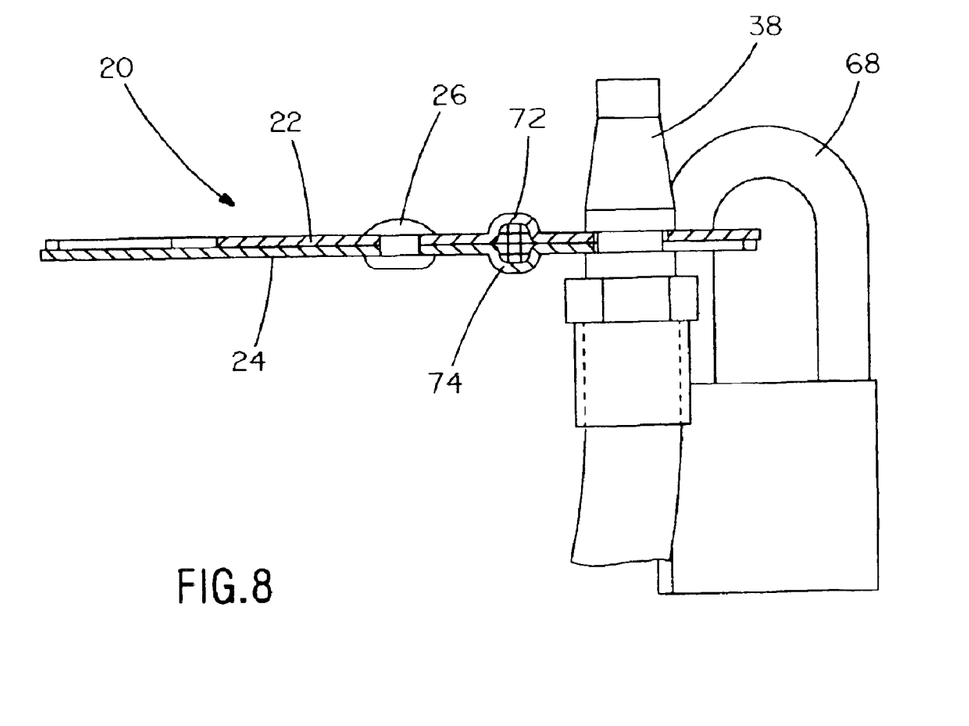
FIG. 8 is a cross-sectional view taken along lines 8—8 of FIG. 7.
Figure 9:
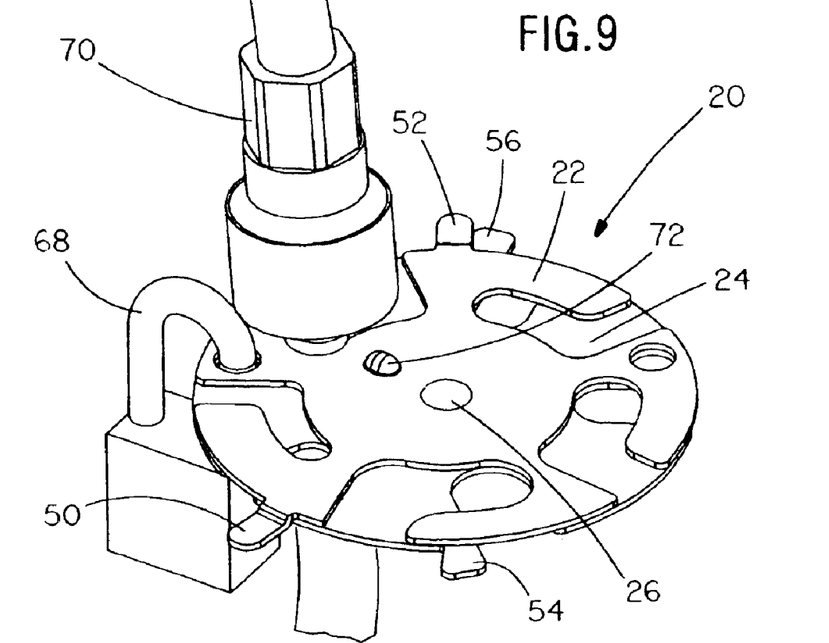
FIG. 9 is a top perspective view of the pneumatic lockout device of FIG. 1, as a female pneumatic fitting is placed onto the male pneumatic fitting.
Figure 10:
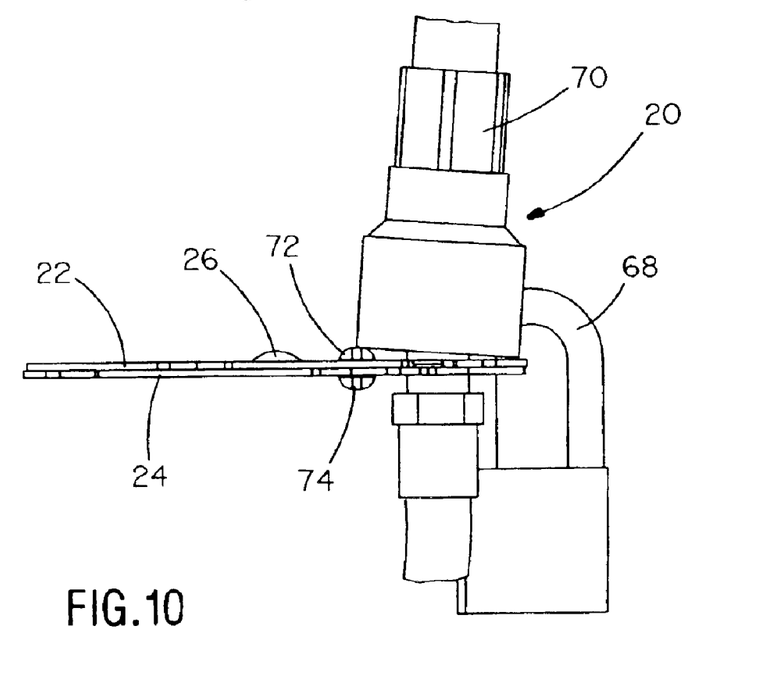
FIG. 10 is a rear view of the pneumatic lockout device of FIG. 9, showing the female pneumatic fitting contacting a female fitting standoff.
Figure 11:
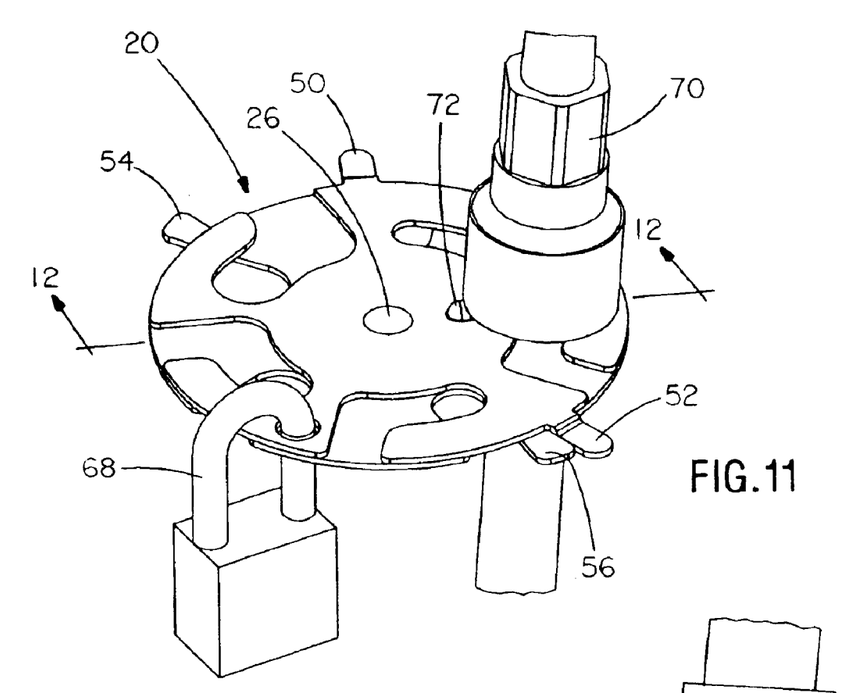
FIG. 11 is a top perspective view of the pneumatic lockout device of FIG. 9, showing the padlock in a different hole.
Figure 12:
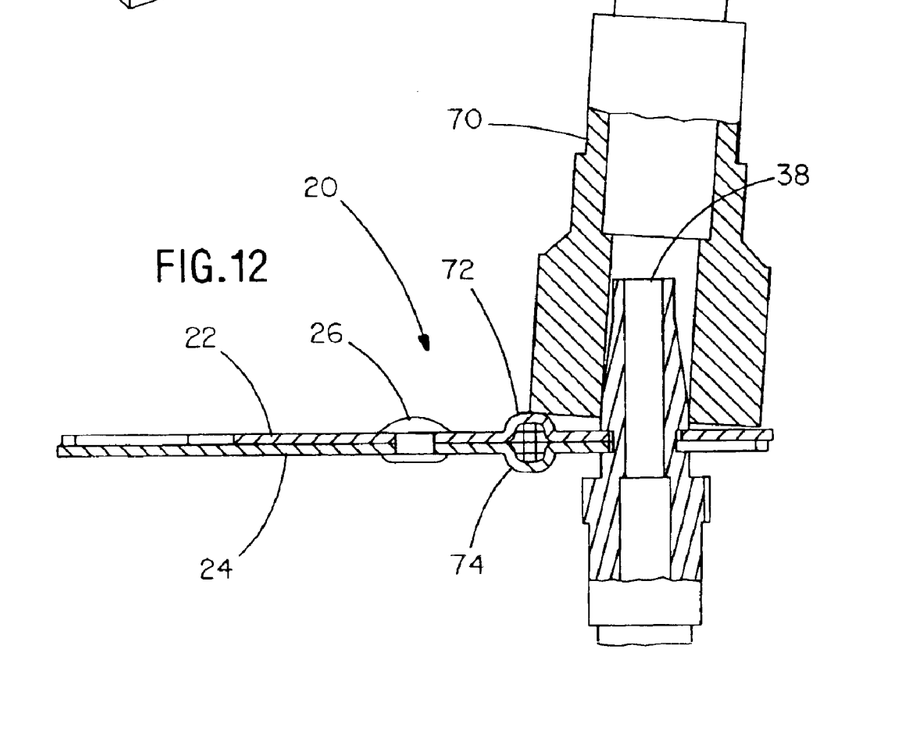
FIG. 12 is a cross-sectional view taken along lines 12—12 of FIG. 11.
Figure 13:
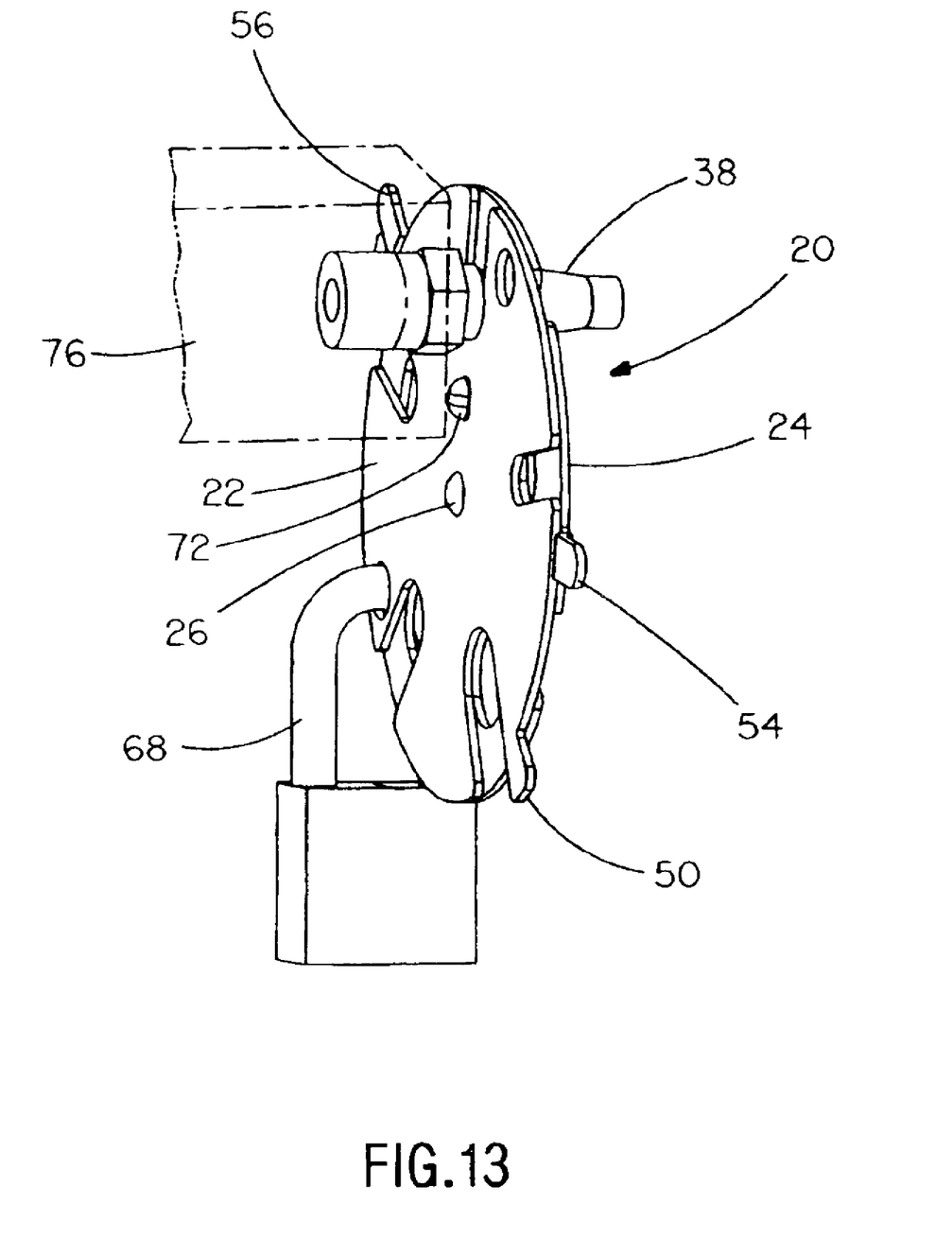
FIG. 13 is a side perspective view of the pneumatic lockout device of FIG. 11, showing a schematic representation of a tool secured to the male pneumatic fitting.

FIGS. 9–12 show a female pneumatic fitting 70 being placed onto male pneumatic fitting 38. As shown in FIG. 10, first disc 22 has female fitting standoff 72, and second disc 24 has female fitting standoff 74. Although first disc 22 and second disc 24 are shown having only one female fitting standoff, it is likewise contemplated that first disc 22 and second disc 24 may have any number of female fitting standoffs placed thereon. As best seen in FIG. 12, female fitting standoffs 72, 74 prevent female pneumatic fitting 70 from engaging male pneumatic fitting 38 to the point that a pneumatic line is energized. Moreover, female fitting standoffs 72, 74 prevent pneumatic line activation in either orientation. As best seen in FIG. 6, in the unlocked position, female fitting standoffs 72, 74 are offset. Conversely, as best seen in FIG. 8, in the locked position, female fitting standoffs 72, 74 are aligned. As shown in FIG. 13, a tool 76 may be secured to male pneumatic fitting 38, instead of having female pneumatic fitting 70 placed thereon.

In operation, tabs 50, 54 are squeezed together to position first disc 22 and second disc 24 in the unlocked position, as shown in FIG. 3. Pneumatic fitting 38 is positioned within slots 28, 40, as shown in FIG. 5. Tabs 52, 56 are then squeezed together to capture pneumatic fitting 38, and align lock apertures 60, 64 and 62, 66, respectively. Padlock 68 is installed in either one of the aligned locking apertures.

The disclosed invention provides a pneumatic lockout device having the ability to lockout a large range of male pneumatic fittings. It should be noted that the above-described and illustrated embodiments and preferred embodiments of the invention are not an exhaustive list of the forms such a pneumatic lockout device in accordance with the invention might take; rather, they serve as exemplary and illustrative of embodiments of the invention as presently understood. By way of example, and without limitation, a pneumatic lockout device having more than five slots on each disc is contemplated to be within the scope of the invention. Many other forms of the invention are believed to exist.

What is claimed is:

1. A method of securing a pneumatic fitting in a pneumatic lockout device comprising the steps of:
   providing a first disc having at least a first slot and at least a first tab;
   providing a second disc having at least a second slot and at least a second tab;
   securing the first disc to the second disc;
   positioning the first disc and the second disc in an unlocked position;
   inserting a pneumatic fitting in the first slot and the second slot; and
   rotating at least one of the first disc and the second disc to capture the pneumatic fitting.

2. The method of claim 1 further comprising the step of inserting a locking device through a first lock aperture and a second lock aperture to prevent the first disc and the second disc from rotating.

3. A pneumatic lockout device comprising:
   a first disc having at least a first L-shaped slot and at least a first tab;
   a second disc secured to the first disc, the second disc having at least a second slot and at least a second tab;
   a pneumatic fitting having a fitting groove, the fitting groove positionable within the first slot and the second slot,
   wherein the pneumatic lockout device is movable from an unlocked position to a locked position, while the fitting groove is positioned within the first slot and the second slot.

4. A pneumatic lockout device comprising:
   a first disc having at least a first slot and at least a first tab;
   a second disc secured to the first disc, the second disc having at least a second slot and at least a second tab,
   wherein the first disc is fastened to the second disc by a rivet, and the first disc and the second disc can freely rotate about the rivet;
   a pneumatic fitting having a fitting groove, the fitting groove positionable within the first slot and the second slot, wherein the pneumatic lockout device is movable from an unlocked position to a locked position, while the fitting groove is positioned within the first slot and the second slot.

5. A pneumatic lockout device comprising:

a first disc having at least a first slot and at least a first tab;

a second disc secured to the first disc, the second disc having at least a second slot and at least a second tab;

a pneumatic fitting having a fitting groove, the fitting groove positionable within the first slot and the second slot, wherein the pneumatic lockout device is movable from an unlocked position to a locked position, while the fitting groove is positioned within the first slot and the second slot, wherein in the unlocked position the first slot and the second slot are aligned.

6. A pneumatic lockout device comprising:

a first disc having at least a first slot and at least a first tab;

a second disc secured to the first disc, the second disc having at least a second slot and at least a second tab;

a pneumatic fitting having a fitting groove, the fitting groove positionable within the first slot and the second slot, wherein the pneumatic lockout device is movable from an unlocked position to a locked position, while the fitting groove is positioned within the first slot and the second slot, wherein in the locked position at least one of the first disc and the second disc has been rotated to capture the pneumatic fitting.

7. A pneumatic lockout device comprising:

a first disc having at least a first slot, at least a first tab and at least a first lock aperture;

a second disc secured to the first disc, the second disc having at least a second slot, at least a second tab and at least a second lock aperture;

a pneumatic fitting having a fitting groove, the fitting groove positionable within the first slot and the second slot, wherein the pneumatic lockout device is movable from an unlocked position to a locked position, while the fitting groove is positioned within the first slot and the second slot.

8. The pneumatic lockout device of claim 7, wherein in the locked position the first lock aperture and the second lock aperture are aligned to accept a locking device therethrough.

9. A pneumatic lockout device comprising:

a first disc having at least a first slot, at least a first tab and at least a first female fitting standoff;

a second disc secured to the first disc, the second disc having at least a second slot and at least a second tab;

a pneumatic fitting having a fitting groove, the fitting groove positionable within the first slot and the second slot, wherein the pneumatic lockout device is movable from an unlocked position to a locked position, while the fitting groove is positioned within the first slot and the second slot.

10. The pneumatic lockout device of claim 9, wherein the second disc has at least a second female fitting standoff.

11. The pneumatic lockout device of claim 10, wherein in the locked position the first female fitting standoff and the second female fitting standoff are aligned.

* * * * *